June 6, 1967 R. N. MELLOT ETAL 3,324,307

FLIP-FLOP CIRCUIT

Filed Sept. 10, 1964 3 Sheets-Sheet 1

INVENTORS
ROBERT N. MELLOTT
ROBERT FEUER
ROBERT H. COLE
BY Arthur Freilich
ATTORNEY INVENTORS
ROBERT N. MELLOTT
ROBERT FEUER
ROBERT H. COLE
BY Arthur Frölich
ATTORNEY INVENTORS
ROBERT N. MELLOTT
ROBERT FEUER
ROBERT H. COLE
BY Arthur Freilich
ATTORNEY 3,324,307
Patented June 6, 1967

3,324,307

FLIP-FLOP CIRCUIT

Robert N. Mellot, Northridge, and Robert Feuer and Robert H. Cole, Canoga Park, Calif., assignors to The Bunker-Ramo Corporation, Canoga Park, Calif., a corporation of Delaware Filed Sept. 10, 1964, Ser. No. 395,491
5 Claims. (Cl. 307—88.5)

ABSTRACT OF THE DISCLOSURE

A flip-flop circuit in which the base-emitter junction of a second transistor is connected directly across the collector-emitter electrodes of a first transistor. A trigger point is defined at the collector of the first transistor such that current driven into the point will forward bias the second transistor and current extracted from the point will forward bias the first transistor. The trigger point is controlled by a trigger stage which includes a temporary storage circuit which is disabled in response to a clock pulse and is switched to first and second states respectively in response to first and second logic signals provided between clock pulses.

This invention relates generally to electronic circuit arrangements and more particularly to improved electronic flip-flop circuits adapted for use in data processing apparatus and the like.

As the speed requirements of data processing systems become greater, it is essential to provide circuits which are able to operate corespondingly faster. In view of this, it is a primary object of the present invention to provide a flip-flop circuit which is capable of switching very rapidly.

In all synchronous data processing systems, i.e., systems in which all circuits are switched coincident with the generation of a clock pulse, a race problem exists in which, under certain conditions, a flip-flop can switch prematurely during the latter portion of a clock period rather than during the initial portion of the succeeding clock period. In most systems, this problem is avoided by introducing a time delay in the flip-flop circuits which causes them to switch in the latter portion of clock periods to thus prevent them from initiating switching in a dependent flip-flop during the same clock period. The introduction of a time delay is of course undesirable in systems where fast operation is significant. Accordingly, it is a further object of the present invention to provide a flip-flop circuit which is sensitive to the leading edge of a clock pulse, rather than to the entire clock pulse. Thus, by utilizing a plurality of these flip-flops in a system, the race problem is avoided without the introduction of any time delay.

Many different flip-flop circuit arrangements are known in the prior art for storing binary information useful in data processing and other apparatus. By far the most commonly employed circuit is the Eccles-Jordan type circuit or some modification thereof in which the output terminal of each of a pair of transistors (or equivalent devices) is cross-coupled to the control terminal of the other. Thus, so long as one of the transistors conducts, the other is held off and vice versa. In this type of flip-flop circuit, two input terminals usually must be provided to enable each of the transistors to be selectively turned on.

In many applications, it would be advantageous if the flip-flop circuit had a single input terminal which could be conveniently used to selectively switch the flip-flop to either state. Accordingly, it is an additional object of the present invention to provide a basic flip-flop stage having a single input terminal to which signals can be applied for switching the stage to either of its two stable states.

It is a still further object of the present invention to provide a flip-flop circuit of the above-described type which utilizes a minimum number of parts and accordingly, is reliable and relatively inexpensive.

In accordance with a preferred embodiment of the present invention, a flip-flop stage is provided in which the base-emitter junction of a second transistor is connected directly across the collector-emitter electrodes of a first transistor. A trigger point is defined at the collector of the first transistor such that current driven into the point will forward bias the second transistor and current extracted from the point will forward bias the first transistor. The trigger point is controlled by a trigger stage which includes a temporary storage circuit responsive to both a clock pulse source and a logical signal source. The temporary storage circuit is switched to first and second states respectively in response to first and second signals provided by the logical signal source between pulses provided by the clock pulse source. During the provision of a pulse from the clock pulse source, the coupling between the logical signal source and the temporary storage circuit is effectively disabled. Dependent upon the state of the temporary storage circuit, each clock pulse will either drive current into or extract current from the trigger point.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
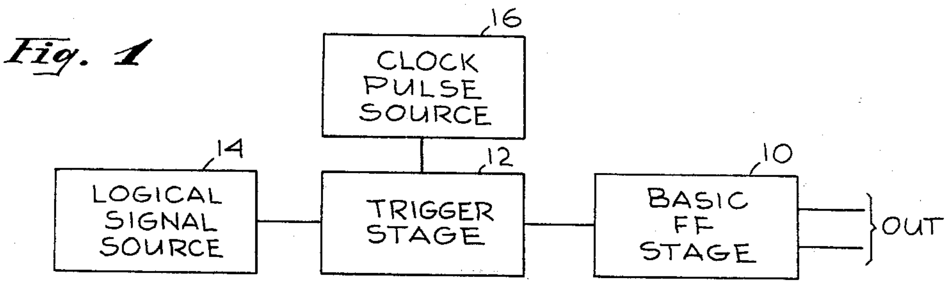
FIGURE 1 is a block diagram of a preferred embodiment of the present invention.

Attention is now called to FIGURE 1 of the drawings which illustrates in block form a circuit arrangement in accordance with the invention which includes a basic flip-flop stage 10 having an output terminal responsive to the output terminal of a trigger stage 12. The trigger stage 12 is responsive to the output of a logical signal source 14 and a clock pulse source 16. The trigger stage 12 functions to switch the basic flip-flop stage 10 to the binary state defined by the output of the logical signal source immediately preceding the leading edge of each clock pulse provided by the clock pulse source 16. It is to be noted that the basic flip-flop stage 10 has a single input terminal to which signals are applied by the trigger stage for switching the stage 10 to either of its stable states. In the event the output of the logical signal source charges during the generation of clock pulse, the trigger stage 12 prevents this change from affecting the state of the flip-flop stage 10.

Figure 2:
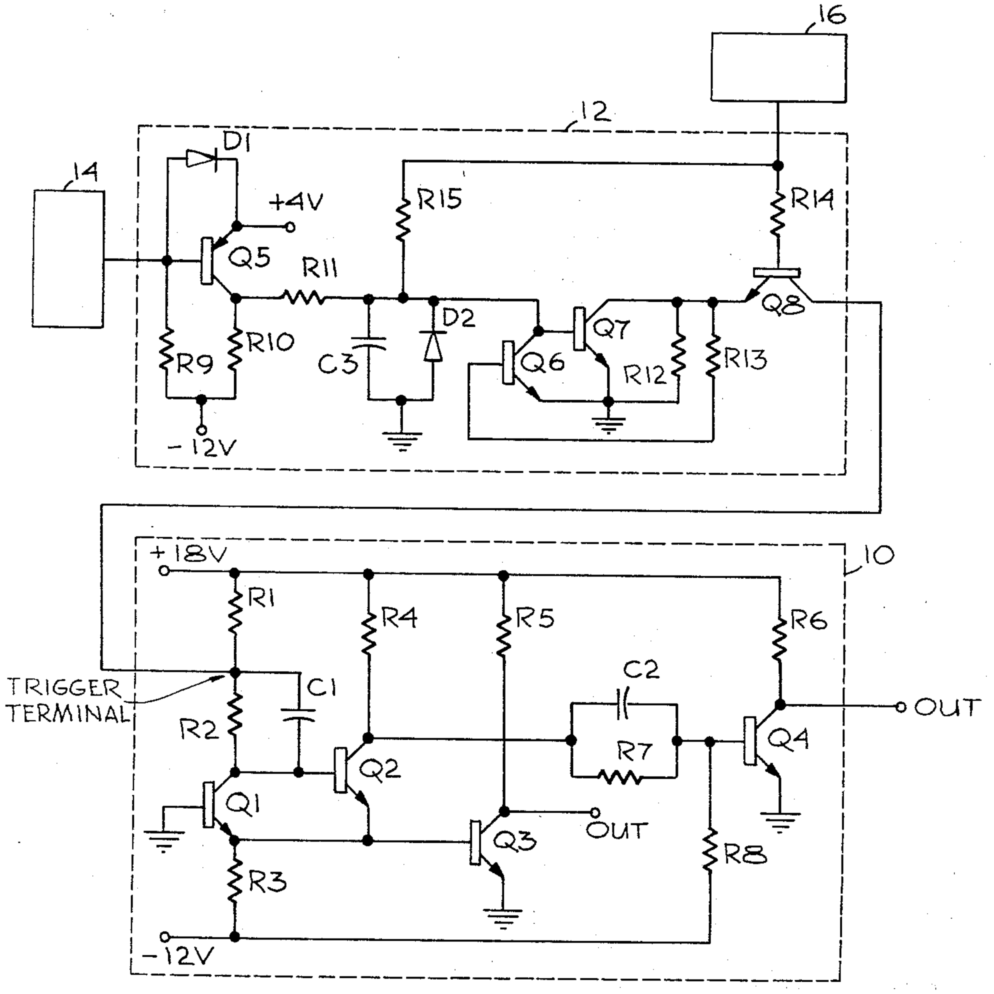
FIGURE 2 is a schematic diagram illustrating the internal structure of the blocks of FIGURE 1.

Attention is now called to FIGURE 2 which schematically illustrates the basic flip-flop stage 10 and trigger stage 12. The basic flip-flop stage 10 includes a bistable portion comprised of NPN transistors Q1 and Q2. The collector of transistor Q1 is connected in series with resistors R1 and R2 to a source of positive reference potential, nominally shown as +18 volts. A capacitor C1 is connected in parallel with resistor R2. The emitter of transistor Q1 is connected through a resistor R3 to a source of negative reference potential, nominally shown as −12 volts. The base of transistor Q1 is grounded.

The collector of transistor Q2 is connected through a resistor R4 to the previously mentioned source of positive reference potential and the emitter thereof is connected directly to the emitter of transistor Q1. The base of transistor Q2 is connected to the collector of transistor Q1.

A pair of output transistors Q3 and Q4, both of the NPN type, are provided. The emitters of transistors Q3 and Q4 are both connected to ground and the collectors thereof are respectively connected through resistors R5 and R6 to the previously mentioned source of positive reference potential. The collectors of transistors Q3 and Q4 serve as the flip-flop output terminals. The base of transistor Q3 is connected to the emitters of transistors Q1 and Q2 while the base of transistor Q4 is connected through a parallel circuit consisting of capacitor C2 and resistor R7 to the collector of transistor Q2. Resistor R8 connects the base of transistor Q4 to the source of negative reference potential.

Prior to considering the operation of the basic flip-flop stage 10, it is pointed out that the potentials illustrated herein are exemplary only and the invention certainly should not be interpreted as being restricted thereto. Similarly, the transistor types employed herein are arbitrarily chosen and opposite transistor types could be utilized equally as well with suitable circuit modifications apparent to one skilled in the art. In order to further facilitate an understanding of the operation of the basic stage 10, a table of values for the recited components is set forth below and it is expressly mentioned that the invention should not be understood as restricted to these values.

| | |
|---|---|
| *R1*=8.2K ohms | *R6*=1.0K ohms |
| *R2*=1.0K ohms | *R7*=1.0K ohms |
| *R3*=3.3K ohms | *R8*=6.8K ohms |
| *R4*=1.5K ohms | *C1*=220 picofarads |
| *R5*=1.0K ohms | *C2*=220 picofarads |

The operation of the bistable portion of the stage 10 depends upon the fact that the collector-to-emitter drop of a saturated transistor is usually smaller than the forward voltage required across the base-emitter junction of a second transistor to make the second transistor conduct. For example, considering the transistors Q1 and Q2, should transistor Q1 be conducting, its collector-to-emitter drop would typically be +.1 volt. Transistor Q2 typically would require +.5 volt across its base-emitter junction to conduct. Thus, when transistor Q1 is on, it holds transistor Q2 off.

More particularly, consider a first stable state with transistor Q1 conducting and transistor Q2 held off. Inasmuch as resistors R1 and R2 provide less current than is demanded by resistor R3 when transistor Q1 conducts, it will be saturated and thus its collector-to-emitter voltage drop will be insufficient to forward bias transistor Q2. The emitter of transistor Q1 will of course be held below ground so that the transistor Q3 will also be cut off and its collector will reside at +18 volts.

Inasmuch as transistor Q2 is cut off, current is made available through resistor R4 to the base of transistor Q4 permitting transistor Q4 to conduct in saturation so that its collector resides near ground.

The second stable state of stage 10 is defined by transistor Q2 conducting so as to sufficiently raise the potential on the emitter of transistor Q1 to hold transistor Q1 off. Base drive for transistor Q2 is provided through resistors R1 and R2. More current is available to the collector of transistor Q2, from resistor R4, than can be absorbed by resistor R3. This excess current flows into the base of transistor Q3. As a consequence, transistor Q3 conducts in saturation causing its collector to reside near ground. When transistor Q2 conducts in saturation, its collector of course will reside near ground and thus absorb the base current otherwise available to transistor Q4. Accordingly, when transistor Q2 conducts in saturation, transistor Q4 is cut off and its collector resides near +18 volts.

Assume initially that the stage 10 defines its first stable state with transistor Q1 conducting and transistor Q2 cut off. In order to switch the stage 10, transistor Q2 can be turned on to thus cut off transistor Q1. In accordance with the invention, this can be accomplished by externally forcing current into the junction between resistors R1 and R2 (hereinafter called the trigger terminal) of the stage 10. As the current driven into the trigger terminal increases, the potential on the emitter of transistor Q1 will continue to rise and thus bring transistor Q1 out of saturation thus causing its collector to rise. When its collector rises sufficiently to forward bias transistor Q2, transistor Q2 turns on to thus raise the emitter of transistor Q1 above ground thereby cutting it off. When transistor Q1 cuts off, base drive for transistor Q2 becomes available from resistors R1 and R2.

If the second stable state is defined, the stage 10 can be switched to its first stable state by removing current from the trigger terminal to force the base of transistor Q2 below ground. The emitter of transistor Q2 follows the base and when it has gone sufficiently negative, the base-emitter junction of transistor Q1 is again forward biased to permit transistor Q1 to saturate and thus cut off transistor Q2.

It should be apparent that the potential on the junction between the collector of transistor Q1 and the base of transistor Q2 will be maintained substantially constant (within a few tenths of ground potential) regardless of whether transistor Q1 or transistor Q2 conducts. Due to the extremely small voltage swings encountered in switching between states, the effects of stray capacitance is minimized and switching can be effected very rapidly. It is also pointed out that the state of the basic stage 10 is controlled from a single terminal and moreover the current supplied to or withdrawn from this terminal acts directly on the bistable portion of the stage 10 and time is thus not needlessly spent on charging various circuit elements. It is also pointed out that the current needed to trigger the bistable portion of the stage 10 is reasonably well defined and is not critically dependent upon the parameters of the transistors. The output transistors Q3 and Q4 function to isolate the bistable portion of the stage 10 from the rest of the system so that external disturbances at the output are incapable of upsetting the state defined by the transistors Q1 and Q2.

The capacitor C1 functions to cut transistor Q2 off faster than would be possible in its absence. More particularly, with the exemplary circuit values previously set forth, the trigger terminal at the junction between the resistors R1, R2, and capacitor C1 normally resides at approximately +2 volts. When current is withdrawn from the trigger terminal by reducing the potential thereof, the capacitor immediately couples this reduction in potential to the base of transistor Q2 to thus cut it off. In order to permit the transistor Q1 to turn on faster, an inductor (not shown) can be placed in series with the base of transistor Q3. The inductor will function to maintain a constant current to the base of transistor Q3 while the current flowing out of the emitter of transistor Q2 decreases. By tending to maintain the current to the base of transistor Q3 constant, the entire change in the current from the emitter of transistor Q2 appears in the current flowing in resistor R3. Thus, the potential on the emitter of transistor Q1 is able to decrease more rapidly.

The trigger stage 12 can be used to selectively drive a current into the trigger terminal of the basic stage 10 or extract a current therefrom. The action of the trigger stage 12 is dependent upon the signals provided thereto by the logical signal source 14 and clock pulse source 16.

The trigger stage 12 includes an input amplifier stage comprised of a PNP transistor Q5 whose base is connected to the output of logical signal source 14. The emitter of transistor Q5 is connected to a positive potential source, nominally shown as +4 volts. A clamping diode D1 is connected between the emitter and base of transistor Q5. The base and collector of transistor Q5 are respectively connected through resistors R9 and R10 to the previously mentioned source of negative reference potential. The collector of transistor Q5 is connected through a resistor R11 to a temporary storage stage including NPN transistors Q6 and Q7. More particularly, the resistor R11 is connected to the collector of transistor Q6 and to the base of transistor Q7. The emitters of transistors Q6 and Q7 are connected together and to a source of ground potential. A resistor R12 is connected across the collector and emitter of transistor Q7 for the purpose of discharging stray capacitance and a resistor R13 is connected between the collector of transistor Q7 and the base of transistor Q6.

A gate or output transistor Q8, of the NPN type is provided. The emitter of transistor Q8 is connected directly to the collector of transistor Q7 and the collector of transistor Q8 is connected to the trigger terminal of the basic stage 10. The base of transistor Q8 is connected through a resistor R14 to the output of the clock pulse source 16. The output of the clock pulse source 16 in addition is connected through a resistor R15 to the junction between the resistor R11 and collector of transistor Q6. This junction is connected to ground through a parallel circuit consisting of capacitor C3 and a diode D2.

The following table defines exemplary values for the components illustrated in the trigger stage 12:

$R9$=6.8K ohms
$R10$=15 ohms
$R11$=1.5K ohms
$R12$=15K ohms
$R13$=3.3K ohms
$R14$=1.0K ohms
$R15$=2.2K ohms
$C3$=47 picofarads Let it be assumed that the output of the clock pulse source varies between —.7 volt and +7 volts. Let it further be assumed that the output of the logical signal source 14 resides either at +3.6 or +4.4 volts. Briefly, when the clock pulse source 16 provides a negative output signal, the transistor Q8 will be disabled to thus effectively disconnect the temporary storage stage comprised of transistors Q6 and Q7 from the basic stage 10.

More particularly, consider initially the situation when source 14 provides a low level input signal to thus saturate transistor Q5. Also initially assume that the output of the clock source 16 is negative. Under these conditions, the capacitor C3 will be charged to approximately +.7 volt due to the current supplied to ground through the base-emitter junction of transistor Q7. Transistor Q8 will be cut off since its base-emitter junction is reverse biased by .7 volt and its collector-base junction is also reverse biased.

Assume that the output of the clock 16 now rises to +7 volts. Current to maintain transistor Q7 on is now supplied through resistor R15. Transistor Q6 is cut off inasmuch as no base drive current is available through resistor R13 since the collector of transistor Q7 is close to ground. Should transistor Q5 cut off when the output of the clock 16 is at +7 volts, it would have no effect on transistors Q6 and O7 since the current available through resistor R15 is sufficient to maintain transistor Q7 on even in the absence of the collector current from transistor Q5. The positive potential available from the output of the clock pulse source 16 drives a current through resistor R14 to the base of transistor Q8 to thus forward bias transistor Q8. With transistor Q8 thus forward biased and transistor Q7 saturated, current is withdrawn from the trigger terminal of the basic stage 10 to thus turn transistor Q1 on.

Now assume a situation when the signal provided by the source 14 is high and transistor Q5 is thus cut off. Assume initially that the output of the clock source 16 is low. Consequently, capacitor C3 will be charged to a negative potential. The negative potential on the base of transistor Q7 will hold it off. When the output of the clock pulse source 16 becomes positive, capacitor C3 will begin to charge through resistor R15. Transistor Q7 of course is unable to come on however until the potential on the base thereof rises above ground. During this interval in which the capacitor C3 is being charged, a positive current is being applied to the base of transistor Q8 which is forced into both the emitter and collector thereof. The current forced into the emitter of transistor Q8 flows through resistor R13 and constitutes a base current for transistor Q6 inasmuch as transistor Q7 is still held off by capacitor C3. Consequently transistor Q6 is forward biased to thus hold transistor Q7 off by establishing an insufficient forward biasing potential across the base emitter junction thereof. The emitter current in transistor Q8 will increase until the emitter potential rises (due to the drop across resistor R13) to the potential at the trigger terminal of the stage 10. The excess current delivered by resistor R14 will thus be driven into the trigger terminal to accordingly turn transistor Q2 on and transistor Q1 off.

Should transistor Q5 turn on during the time the output of the clock pulse source 16 is positive, it will have no effect on transistor Q6 and Q7 inasmuch as the current supplied through resistor R11 will be easily absorbed by the collector of the saturated transistor Q6.

Figure 3:
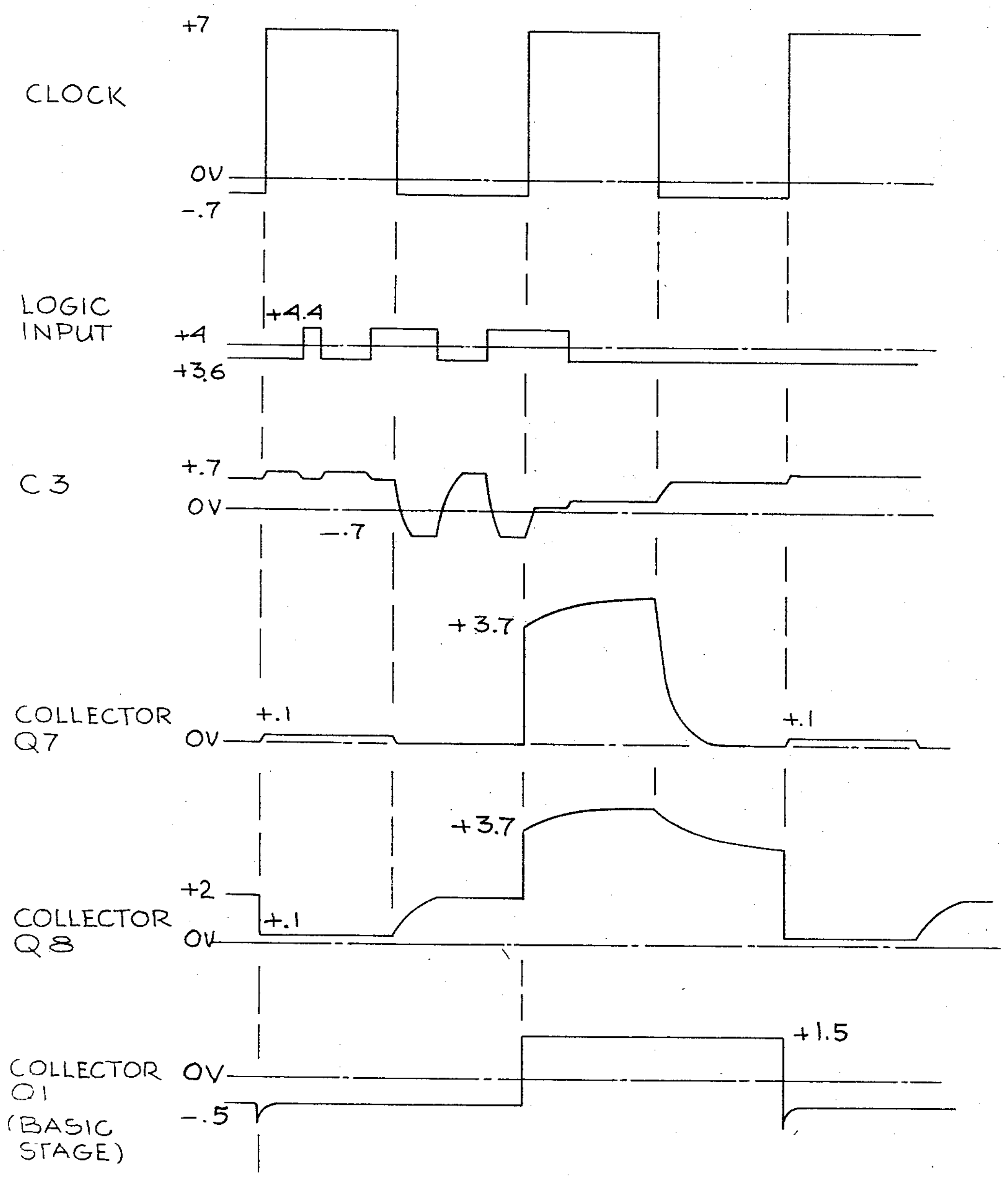
FIGURE 3 is a waveform chart provided to demonstrate the operation of the circuit of FIGURE 2.

FIGURE 3 illustrates certain waveforms at various points in the circuit of FIGURE 2 occurring in response to the arbitrarily chosen output of the logical signal source 14.

From what has been said thus far regarding the operation of the stages 10 and 12, it should be apparent that the basic stage 10 will respond to the state of the temporary storage circuit (Q6, Q7) at the leading edge of the positive pulse provided by the pulse source 16. The stage 10 is thus insensitive to variations in clock pulse width and accordingly, the various race problems usually encountered in data processing systems is avoided.

Figure 4:
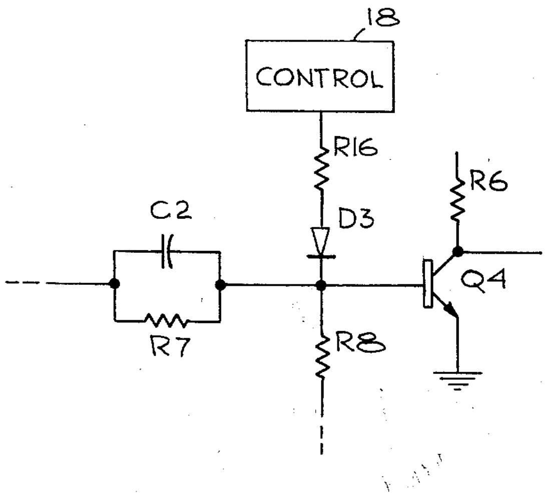
FIGURE 4 is a schematic diagram of a circuit arrangement for controlling the output terminals of the circuit of FIGURE 2 independent of the basic flip-flop stage.

Attention is now called to FIGURE 4 which illustrates a useful modification of the stage 10. The modification consists of providing a resistor R16 in series with a diode D3 between a control circuit 18 and the base of output transistor Q4. A similar modification could be applied to transistor Q3 if desired. By providing the additional resistor and diode as shown in FIGURE 4, the output at the collector of transistor Q4 can be controlled externally, independent of the state of the flip-flop stage 10. More particularly, when the output of the control circuit 18 is negative, the diode D3 is reverse biased and the condition of the transistor Q4 is determined by the state of the transistors Q1 and Q2 as aforedescribed. However, when the output of the control means 18 is positive, sufficient current to turn transistor Q4 on, regardless of the state of the transistors Q1 and Q2, is provided through resistor R16. Accordingly, the output available at the collector of transistor Q4 can be selected to represent either the state of transistors Q1 and Q2 or the state of some external control circuit 18. By reversing the polarity of the diode D3, the transistor Q4 of course can be turned on in response to a negative signal provided by the control means 18.

Figure 5:
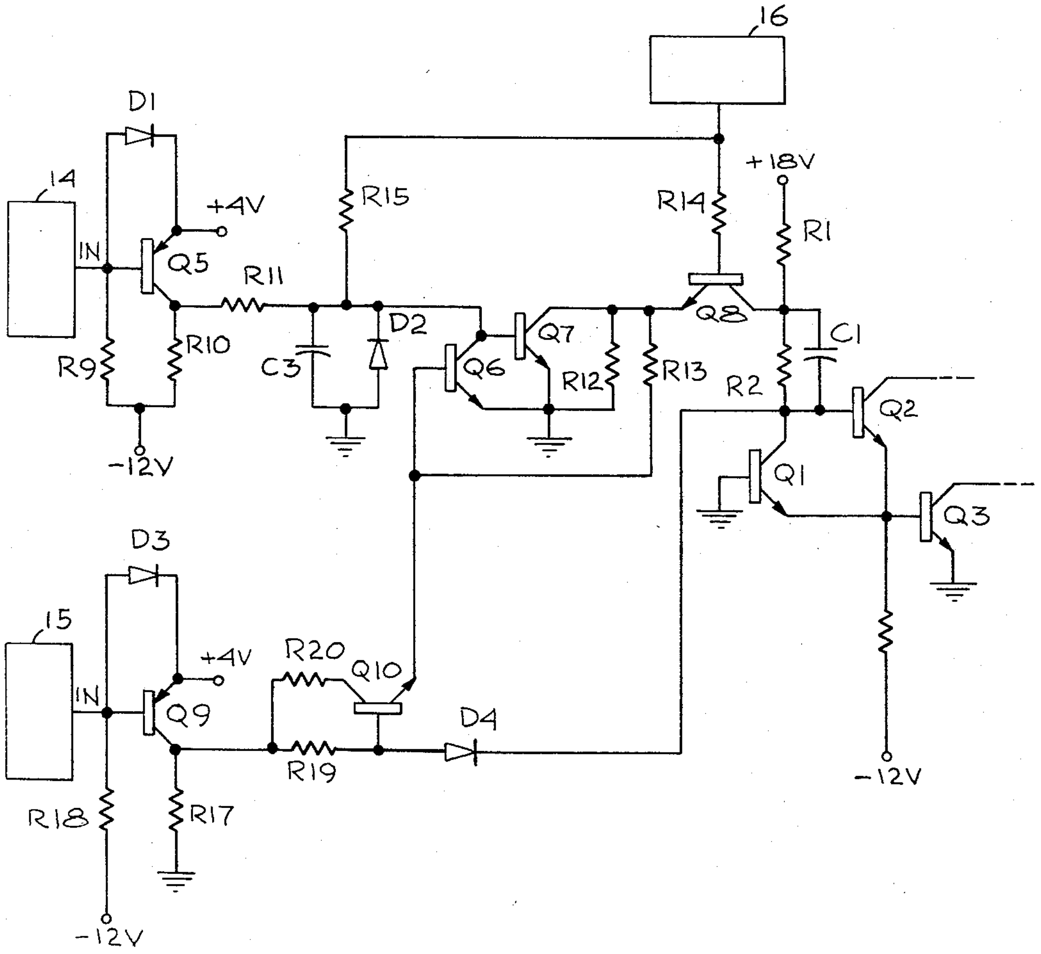
FIGURE 5 is a schematic diagram of the circuit of FIGURE 2 modified so as to be responsive to a pair of logical signal sources.

Attention is now called to FIGURE 5 which illustrates how the circuit of FIGURE 2 could be modified so as to be responsive to a pair of logical signal sources. More particularly, the output of source 15 is connected to the base of PNP transistor Q9 whose emitter is connected to a positive 4 volt reference potential and whose collector is connected through resistor R17 to ground. Resistor R18 and diode D3 respectively connect the base of transistor Q9 to the negative 12 volt reference potential and to the emitter of transistor Q9. The collector of transistor Q9 is connected through resistor R19 and diode D4 to the collector of transistor Q1 of stage 10. An NPN transistor Q10 is provided whose base is connected to the junction between resistor R19 and diode D4 and whose collector is connected through resistor R20 to collector of transistor Q9. The emitter of transistor Q10 is connected to the base of transistor Q6.

Exemplary values for the newly introduced components are as follows:

$R17=1.0$K ohms
$R18=6.8$K ohms
$R19=10$K ohms
$R20=3.3$K ohms

The circuit of FIGURE 5 operates in response to inputs provided by sources 14 and 15. More particularly, if stage 10 is set, i.e. transistor Q1 is off, then a positive clock pulse will have stage 10 set if source 14 provides a high signal to cutoff transistor Q5 or source 15 provides a low signal to saturate transistor Q9. Under all other conditions, the positive clock pulse will reset stage 10, i.e. cut off transistor Q2.

The circuit operation with respect to each type of output signal provided by source 14 has been considered. With respect to source 15, initially consider the situation when transistor Q9 is saturated and transistor Q1 is on. Current from resistor R19 will be shunted through diode D4 and transistor Q10 will be cut off. On the other hand when transistor Q9 is saturated and transistor Q1 is cut off, transistor Q10 will be turned on to provide base current for transistor Q6 thus holding off transistor Q7 to drive current into the trigger terminal of stage 10. This action of course tends to keep stage 10 set.

If the output of source 15 were high and the output of source 14 low, then transistor Q9 and the rest of the newly added circuitry would have no effect and the positive clock would cause current to be extracted from the stage 10 trigger point to permit transistor Q1 to turn on.

As discussed in regard to the output of source 14 changing during a positive clock pulse, a change in the output of source 15 will have no effect on the state of stage 10. More particularly, if source 14 provides a high output signal just before a clock pulse, then a change in the source 15 output signal has no effect since transistor Q6 will turn on regardless.

Consider the situation when the output of source 14 is low and transistor Q1 is on. Transistor Q10 will be held off independent of source 15. Transistor Q7 will be saturated from resistor R11. When a clock pulse is provided, transistor Q7 will remain on and thus the state of stage 10 is independent of source 15 in this situation.

If transistor Q1 is off and both sources 14 and 15 provide low signals, transistors Q10 and Q6 will be saturated. When a clock pulse is provided, base current to transistor Q6 will be provided through resistor R13 and transistor Q6 will be kept on regardless of a change in the output of source 15.

Consider the situation in which the outputs of sources 14 and 15 are respectively low and high and transistor Q1 is off. When a clock pulse is provided, transistor Q7 will be saturated thus turning on transistor Q1. If the output of source 15 then goes low, current from resistor R19 cannot turn on transistor Q10 and upset the state of stage 10 because current through resistor R19 will be shunted through transistor Q1.

From the foregoing, it should be appreciated that an improved flip-flop circuit arrangement has been provided herein in which control over a basic flip-flop stage can be exercised from a single trigger terminal. This trigger terminal can be controlled by a trigger stage which can drive current into or extract current from the trigger terminal in accordance with the output of a logical signal source immediately prior to the leading edge of a pulse provided by a clock pulse source. By providing a temporary storage circuit within the trigger stage, changes in the output of the logical signal source during a clock pulse period are prevented from affecting the basic flip-flop stage. Accordingly, all previously encountered race problems are avoided without necessitating the introduction of any significant time delays. Because of this, and because of the minimal voltage swings encountered in the basic flip-flop stage, the disclosed circuit arrangement is able to operate admirably in extremely high speed data processing systems.

The embodiments of the invention in which an exclusive property or privilege is claimed are defined as follows:

1. A flip-flop circuit capable of defining first and second states comprising:
- first and second transistors each having a collector, an emitter, and a base;
- means connecting said first transistor base to a first source of reference potential;
- first and second impedance means respectively connected to said first transistor collector and emitter;
- means connecting said first impedance means to a second source of reference potential and said second impedance means to a third source of reference potential for normally forward biasing said first transistor;
- means connecting said second transistor collector to said second source of reference potential;
- means connecting said second transistor base and emitter respectively to said first transistor collector and emitter whereby a first state is defined when said first transistor conducts to thereby cut off said second transistor by establishing an insufficient forward biasing potential across the base-emitter junction thereof and a second state is defined when said second transistor conducts to thereby sufficiently raise the potential on said emitters to cut off said first transistor;
- first and second output transistors;
- means coupled to said first output transistor and responsive to said first transistor conducting for cutting off said first output transistor;
- means coupled to said second output transistor and responsive to said second transistor conducting for cutting off said second output transistor; and
- means connected to each of said first and second output transistors for selectively forward biasing them independent of the states of said first and second transistors.

2. A flip-flop circuit capable of defining first and second states comprising:
- first and second transistors each having a collector, an emitter, and a base;
- means connecting said first transistor base to a first source of reference potential;
- first and second impedance means respectively connected to said first transistor collector and emitter;
- means connecting said first impedance means to a second source of reference potential and said second impedance means to a third source of reference potential for normally forward biasing said first transistor;
- means connecting said second transistor collector to said second source of reference potential;
- means connecting said second transistor base and emitter respectively to said first transistor collector and emitter whereby a first state is defined when said first transistor conducts to thereby cut off said second transistor by establishing an insufficient forward biasing potential across the base-emitter junction thereof and a second state is defined when said second transistor conducts to thereby sufficiently raise the potential on said emitters to cut off said first transistor;

said circuit means including a bistable state circuit;

a source of recurrent clock pulses;

a source of first and second logical input signals;

means for switching said bistable state circuit to a first state in response to said first logical input signal between successive clock pulses;

means for switching said bistable state circuit to a second state in response to said second logical input signal between successive clock pulses; and means responsive to the leading edge of each of said clock pulses and to said bistable state circuit defining said first and second states for respectively driving a current into the junction point between said first transistor collector and said second transistor base to force said second transistor to conduct and means for extracting a current from said junction point to cut off said second transistor.

3. In combination with a source of first and second input signals and a source of recurring clock pulses, a trigger circuit having an output terminal adapted to pass current in either a first or second direction, said trigger circuit comprising:

a bistable circuit capable of defining first and second states;

coupling means coupling said source of first and second input signals to said bistable circuit for respectively switching said circuit to said first and second states;

means responsive to each of said clock pulses for disabling said coupling means; and means responsive to each of said clock pulses for passing a current through said output terminal in first and second directions respectively when said bistable circuit defines said first and second states.

4. In combination with a source of first and second input signals and a source of recurring clock pulses, a trigger circuit having an output terminal adapted to pass current in either a first or second direction, said trigger circuit comprising:

a bistable circuit including first and second transistors each having a collector, an emitter, and a base capable of defining first and second states in which said first transistor is respectively conducting and cut off;

means responsive to said first and second input signals for respectively switching said bistable circuit to said first and second states;

an output transistor having a collector, an emitter, and a base;

means coupling said output transistor emitter to said bistable circuit;

means coupling said output transistor collector to said output terminal; and means connecting said source of clock pulses to said output transistor base whereby current is driven through said output transistor collector in first and second directions respectively when said bistable circuit defines said first and second states.

5. The combination of claim 4 wherein said first transistor base-emitter junction is connected across said second transistor emitter-collector path and wherein said output transistor emitter is connected in series with said first transistor emitter-collector path; and impedance means coupling said output transistor emitter to said second transistor base.

References Cited

UNITED STATES PATENTS

| | | | |
|---|---|---|---|
| 2,888,579 | 5/1959 | Wanlass ----------- | 307—88.5 |
| 2,986,650 | 5/1961 | Wolfendale -------- | 307—88.5 |

ARTHUR GAUSS, *Primary Examiner.*

B. P. DAVIS, *Assistant Examiner.*